Aug. 11, 1964 B. REIDEL 3,144,605

COMMUNICATION REPEATER EMPLOYING THE PULSE-CODE MODULATION METHOD AND COMPRISING FAULT-ALARM MEANS

Filed June 13, 1962

INVENTOR
BERTHOLD REIDEL
BY
ATTORNEY 3,144,605
Patented Aug. 11, 1964

3,144,605

COMMUNICATION REPEATER EMPLOYING THE PULSE-CODE MODULATION METHOD AND COMPRISING FAULT-ALARM MEANS

Berthold Reidel, Paris, France, assignor to International Standard Electric Corporation, New York, N.Y., a corporation of Delaware Filed June 13, 1962, Ser. No. 202,186
Claims priority, application Germany June 16, 1961
10 Claims. (Cl. 325—2)

The present invention relates to a pulse-code modulation transmission system in which, between attended repeater stations, there are located unattended repeater stations at which there is effected a regeneration of the code pulses.

The invention is based on the principle of the regenerative repeater stations at which the frequency of a pulse generator, on account of a phase comparison with the frequency of the incoming train of signal pulses, is synchronized by the latter to double its frequency, and at which the train of signal pulses as well as the double-frequency train of pulses as delivered by the generator, are fed to an output AND-circuit by which the train of signal pulses is transmitted in a regenerated state—regenerated also with respect to the relative position of the pulse edges—and it is one object of the present invention to provide in a simple way a fault-indicating signal transmission in a system employing such types of regenerative repeater stations.

This fault-indicating signal transmission is supposed to consist in that, in the case of a failure of the code-pulse transmission a characteristic signal is transmitted by that particular unattended station following the source of trouble, to the next successive attended repeater station.

According to the invention this is accomplished in that the pulse generators of the individual regenerative repeater stations have characteristic frequencies lying below the double signal-pulse frequency, and which are lower, as seen in the transmission direction, from station to station, and are in such a way synchronized with a 90°-phase shift with respect to the signal-pulse frequency by the latter, to the double frequency thereof, that under normal operating conditions a control voltage as derived from the phase comparison, will always be applied to the pulse generators, whereas the frequency produced thereby in the absence of the control voltage, especially on account of a lacking input signal, will drop off to its characteristic value, and in that means are provided by which, in the absence of the control voltage, to the one input of the output AND-circuit of the station there is applied a train of pulses of half the characteristic frequency of the generator, as derived from the output of the pulse generator, so that in this case, instead of a train of signal pulses, there is retransmitted a train of pulses of half the characteristic frequency for acting as a fault-indicating signal.

The starting point of the invention as well as an example of embodiment relating to the invention itself are described in detail with reference to the accompanying drawings.

Figure 1:
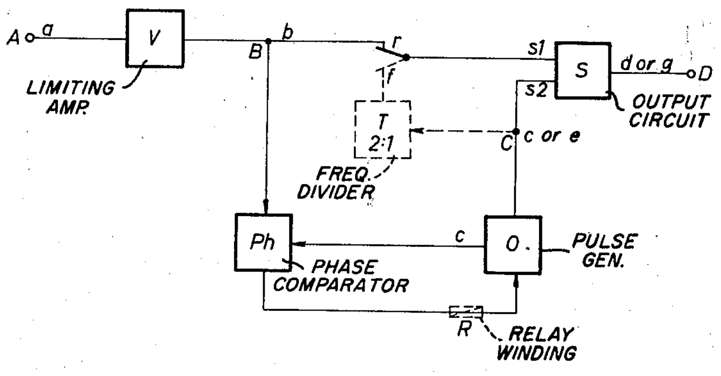
Figure 2:
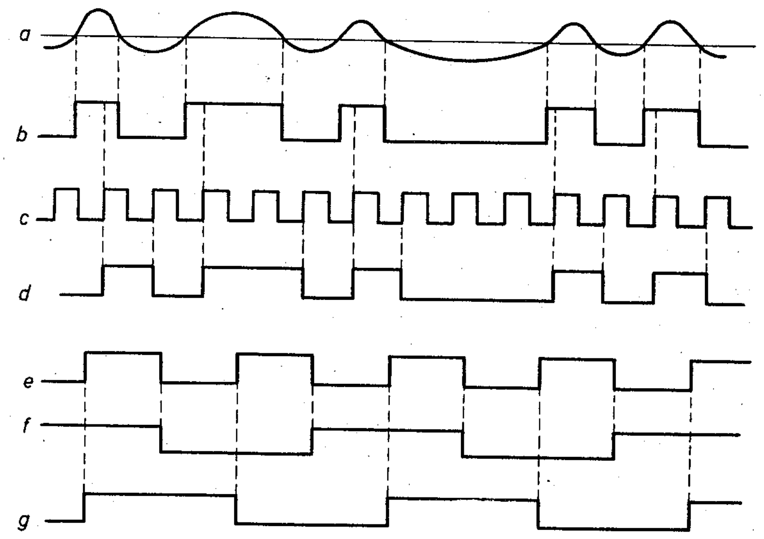

FIG. 1, in the form of a block diagram, shows a regenerative repeater station which, only with the switching means indicated by the dashlines, represents a station for the pulse-code modulation transmission system according to the invention, FIG. 2 shows pulse diagarms for explaining the mode of operation of the station according to FIG. 1.

Referring now to FIG. 1 there will first of all be explained the principle of a regenerative repeater station, on which the invention is based. To this end the switching means indicated by the dashlines, are at first to be ignored, and a direct connection should be imagined to exist extending from the point B to the input *s*1 of the output AND-circuit S, by omitting the contact *r*.

Supposing that a train of code pulses according to FIG. 2*a* arrives at the terminal A. This train of code pulses is applied to a limiting amplifier V that serves to shape the train of pulses which, at the same time, can be regarded as a certain amplitude regeneration, in that rectangular pulses are produced with the edges thereof appearing at the time position of the actual zero crossover of the train of pulses *a*. This shaped train of pulses is supposed to be designated *b*, as shown in FIG. 2*b*, and to appear at point B in FIG. 1.

Due to the dying-away of the edges of the train of pulses along the transmission path, caused by noise voltages, the zero crossovers of the curve *a* may be displaced relatively against one another, so that also the durations of the pulses contained in the train of pulses *b* as well as the interpulse spacings between the pulses are no longer equally long or the exact multiples of a basic length (duration). The function of the station is now supposed to cause a regeneration of the relative positions of the zero crossovers or the pulse edges respectively.

To this end there is provided a rectangular pulse generator O which, in the case of a normal operation, oscillates at double the frequency of the incoming succession of signal elements. The pulse-repetition rate as delivered thereby, is shown in FIG. 2*c*.

This train of pulses *c* as well as the shaped succession of signal elements *b* are fed to a phase comparator P*h*. This phase comparator delivers a regulating criterion adapted to synchronize the generator O to exactly double the frequency of the input sequence of signal elements.

Moreover, the shaped sequence of input-signal elements *b* and the train of pulses *c* which, in the case of a synchronism, is exactly double as high, are fed to the inputs *s*1 or *s*2 respectively of an output AND-circuit S, at the output terminal D of which there will now appear the sequence of signal elements *d* which is also regenerated with respect to the relative positions of the pulse edges (see FIG. 2*d*).

According to the invention, the characteristic signal which is retransmitted by a station if a source of trouble is located either in front of the station or in the station itself, and which causes a failure of the train of signal pulses, is a "resting frequency of the pulse generator O which is characteristic for the respective station. This pulse generator may appropriately be a self-oscillating rectangular-wave generator, whose "resting" frequency or characteristic frequency is being determined by its circuit constants and, in some cases, by a biasing potential and which, with the aid of the control voltage, is capable of being regulated to a frequency double as high as that of the sequence of signal elements.

In the absence of a control voltage the frequency of the generator O will drop to its characteristic value. As a corresponding example, reference is made to the train of pulses shown in FIG. 2*e*. For reasons to be explained hereinafter, these characteristic frequencies must be lower from station to station in the direction of transmission.

Accordingly, the absence of a control voltage must be utilized as a criterion for indicating the failure of the sequence of signal elements. This is accomplished with the aid of a phase comparator P*h* transmitting an output voltage if, and only if the sequence of signal elements is applied to the one input thereof.

Appropriately, this phase comparator may comprise a bistable trigger circuit acting as a switch, which is triggered in response to the increasing edges of the shaped signal pulses *b* for transmitting a pulse before being triggered back by the next incoming decreasing edge of a pulse of the train of pulses applied by the generator to the other input of the phase comparator, for terminating the pulse thereby. This "switch" may be followed by a storage and integrating device. Accordingly, output pulses can only be stored and integrated if a train of pulses, viz. the sequence of signal elements, is applied to the one input of the phase comparator.

The synchronization of the generator O to double the frequency of the sequence of input-signal elements, is effected with a 90°-phase shift, in other words: an increasing edge of the train of pulses *c*—irrespectively of the relative displacements of the edges of the sequence of signal elements *b*—appears by one pulse width of the sequence *c* later than the corresponding increasing edge of the sequence of signal elements *b*.

Hence, as long as a sequence of signal elements is applied to the phase comparator P*h*, this circuit will deliver a control voltage to the generator O. No control voltage will exist in the absence of the sequence of signal elements, and the frequency of the generator O will drop down to its characteristic frequency *e*.

Within the path of feeding the control voltage to the generator O, there is now arranged a switching means R, which may be e.g. the exciting winding of a relay which, in the case of an existing control voltage, serves to retain the contact *r* in its position indicated by the solid line. In the absence of the control voltage the switching means R will respond and will cause the contact *r* to drop into its position indicated by the dashline.

From the output of the generator O, hence from the point C, the output voltage of the generator is applied to a frequency divider T, for dividing the incoming pulse frequency into half. This pulse frequency which has been divided into half, and after the contact *r* has assumed its position as indicated by the dashline, will be applied to the input *s*1 of the output AND-circuit S.

Consequently, those parts of the circuit which are indicated by the dashlines, and after the contact *r* has assumed its position as indicated by the dashline, will become effective in the absence of the input sequence of signal elements and, consequently, in the absence of the control voltage. The generator O will then oscillate at its characteristic frequency, and will supply the train of pulses *e* to the input *s*2 of the AND-circuit S, as well as to the frequency divider T. From this frequency divider, half of the characteristic frequency as shown in FIG. 2*f*, is applied to the input *s*1 of the AND-circuit S. Due to a coincidence in the circuit S, there will then be produced the train of pulses *g* (see FIG. 2*g*) which is again half the characteristic frequency of the pulse generator O.

The division of the characteristic frequency of the generator O as well as the application of the characteristic frequency itself on one hand, and of half its frequency on the other hand, to the AND-circuit S is necessary for enabling one and the same AND-circuit S to be used for the retransmission of the sequence of signal elements, as well as for effecting the transmission of the characteristic frequency, or more precisely of half the characteristic frequency.

The output AND-circuit S may be a bistable flip-flop circuit to the one input *s*2 of which there is applied a train of pulses whose frequency each time amounts to double the frequency of that particular train of pulses which is applied to the other *s*1. The circuit is triggered and starts to produce an output pulse in response to each first increasing edge of the higher frequency train of pulses falling within a pulse duration of the lower frequency train of pulses, and is triggered back as soon as, subsequently to the dropping of the pulse voltage below a fixed threshold, hence after the beginning of an interpulse spacing, there appears the first increasing edge of the higher frequency train of pulses.

If now any one of the preceding stations, in the event of trouble, retransmits as a fault-indicating signal the characteristic frequency or half the frequency thereof to the subsequently following stations instead of the regenerated sequence of signal elements, then these subsequently following stations must be capable of processing this characteristic frequency in the same way as the sequence of signal elements. This, however, means to imply that the characteristic frequency of its pulse generators must each time be lower than the characteristic frequency of the respective preceding station, because only then the respective station is capable of responding to the received characteristic frequency, as well as of regulating it and performing a retransmission.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A repeater terminal for a pulse code modulation system comprising:
   - an input circuit for the train of signal pulses of said system;
   - an output circuit;
   - a pulse generator coupled to said output circuit capable of producing pulses having a first frequency predeterminedly related to the frequency of said train of signal pulses and a second frequency predterminedly related to said first frequency;
   - a comparator circuit coupled to said input circuit and said pulse generator to compare the frequency of said train of signal pulses with the pulses of said generator to produce a control signal; and
   - a control circuit coupled to said comparator circuit, said output circuit and said pulse generator responsive to said control signal to produce in said pulse generator pulses of said first frequency in the presence of said train of signal pulses to regenerate said train of signal pulses in said output circuit and to produce in said pulse generator pulses of said second frequency to pass a train of pulses through said second frequency to pass a train of pulses through said output circuit having a third frequency predeterminedly related to said second frequency to indicate a fault in said system.

2. A system according to claim 1, wherein said control circuit includes
   - a relay winding coupled between the output of said comparator circuit and said pulse generator to enable the synchronizing of the pulses of said pulse generator to said first frequency; and
   - a switch controlled by said relay winding to connect the output of said input circuit to the input of said output circuit.

3. A system according to claim 2, wherein said first frequency is double the frequency of said train of signal pulses and said control signal has a value to activate said relay winding to connect said switch to the output of said input circuit to the input of said output circuit.

4. A system according to claim 3, wherein said second frequency is less than said first frequency and has a distinctive value for said repeater terminal.

5. A system according to claim 1, wherein said control circuit includes
   - a frequency divider coupled to the output of said pulse generator to produce said third frequency;
   - a relay winding coupled between the output of said comparator circuit and said pulse generator responsive to said control signal; and
   - a switch controlled by said relay winding to assume a first position to couple the output of said input circuit to the input of said output circuit and a second position to couple the output of said frequency divider to the input of said output circuit; and said control signal includes a first value when said train of signal pulses are present to synchronize said pulse generator to produce pulses having said first frequency and to dispose said switch in said first position; and a second value during the presence of a fault to enable said pulse generator to produce pulses having said second frequency and to dispose said switch in said second position.

6. A system according to claim 5, wherein said first frequency is double the frequency of said train of signal pulses;

said second frequency is less than said first frequency and has a distinctive value for said repeater terminals; and said frequency divider is a 2:1 divider responsive to saiа second frequency to produce said third frequency.

7. A system according to claim 1, wherein said input circuit includes a limiting amplifier to aid in regenerating said train of signal pulses.

8. A pulse code modulation system comprising a plurality of repeater terminals, each of said repeater terminals including:

an input circuit for the train of signal pulses of said system;

an output circuit;

a pulse generator coupled to said output circuit capable of producing pulses having a first frequency predeterminedly related to the frequency of said train of signal pulses anа a second frequency predeterminedly related to said first frequency;

a comparator circuit coupled to said input circuit and said pulse generator to compare the frequency of said train of signal pulses with the pulses of said generator to produce a control signal;

a control circuit coupled to said comparator circuit, said output circuit and said pulse generator responsive to said control signal to produce in said pulse generator pulses of said first frequency in the presence of said train of signal pulses to regenerate said train of signal pulses in said output circuit and to produce in said pulse generator pulses of said second frequency to pass a train of pulses through said output circuit having a third frequency predeterminedly related to said second frequency to indicate a fault in a particular one of said repeater terminals or a preceding one thereof.

9. A system according to claim 8, wherein said first frequency is double the frequency of said train of signal pulses; and said second frequency is less than said first frequency and has a distinctive value for each of said repeater terminals.

10. A system according to claim 9, wherein said second frequency of each of said repeater terminals has a decreasing value from the transmitting end to the receiving end of said system.

References Cited in the file of this patent

UNITED STATES PATENTS

| | | |
|---|---|---|
| 2,843,669 | Six et al. | July 15, 1958 |
| 2,931,860 | Cookingham | Apr. 5, 1960 |
| 3,078,443 | Rose | Feb. 19, 1963 |

FOREIGN PATENTS

| | | |
|---|---|---|
| 849,891 | Great Britain | Sept. 28, 1960 |